United States Patent [19]

Shinomiya et al.

[11] Patent Number: 5,781,259
[45] Date of Patent: Jul. 14, 1998

[54] LIQUID CRYSTAL DISPLAY APPARATUS

[75] Inventors: Tokihiko Shinomiya, Nara; Kohichi Fujimori, Nabari; Tomoaki Kuratate, Nara, all of Japan

[73] Assignee: Sharp Kabushiki Kaisha, Osaka, Japan

[21] Appl. No.: 688,553

[22] Filed: Jul. 30, 1996

Related U.S. Application Data

[63] Continuation of Ser. No. 630,197, Apr. 10, 1996, abandoned, which is a continuation of Ser. No. 253,930, Jun. 3, 1994, abandoned.

[30] Foreign Application Priority Data

Jun. 4, 1993 [JP] Japan ................................ 5-134347

[51] Int. Cl.$^6$ .................................................. G02F 1/1333
[52] U.S. Cl. .................................................. 349/88; 349/93
[58] Field of Search ............................. 359/51, 81, 67; 349/86, 88, 93

[56] References Cited

U.S. PATENT DOCUMENTS

| 4,733,948 | 3/1988 | Kitahara ........................ 359/67 |
| 4,938,568 | 7/1990 | Margerum et al. ................ 359/51 |
| 5,091,792 | 2/1992 | Kaida ........................... 359/67 |
| 5,128,786 | 7/1992 | Yanagisawa ..................... 359/67 |
| 5,282,070 | 1/1994 | Nishida et al. .................. 359/67 |
| 5,323,252 | 6/1994 | Yoshida et al. .................. 359/67 |
| 5,333,074 | 7/1994 | Hikmet ......................... 359/51 |
| 5,473,450 | 12/1995 | Yamada et al. .................. 359/51 |

FOREIGN PATENT DOCUMENTS

| 4221816 | 1/1993 | Germany ........................ 359/81 |
| 59-20121 | 11/1984 | Japan . |
| 62-54227 | 3/1987 | Japan .......................... 359/81 |
| 63-225226 | 9/1988 | Japan .......................... 359/81 |
| 63-237032 | 10/1988 | Japan .......................... 359/81 |
| 2-153318 | 6/1990 | Japan . |
| 3-72317 | 3/1991 | Japan . |
| 4-60517 | 2/1992 | Japan .......................... 359/81 |
| 4-136916 | 5/1992 | Japan .......................... 359/81 |
| WO 85/04262 | 9/1985 | WIPO . |

Primary Examiner—William L. Sikes
Assistant Examiner—Charles Miller
Attorney, Agent, or Firm—David G. Conlin; Brian L. Michaelis

[57] ABSTRACT

A liquid crystal display apparatus comprising a pair of transparent substrates which consists of a driving side substrate and an opposite side substrate; transparent pixels formed in matrix on said driving side substrate; a first orientation film formed on said pixels; a transparent electrode formed on said opposite side substrate; a shielding layer provided at least on the periphery of each of said transparent pixels and at either between said driving side substrate and said transparent pixels or between said transparent pixels and said orientation film; said pair of transparent substrates being located opposite to each other to form a cell in which a mixture comprising a liquid crystal, a photosetting polymer precursor and its polymerization initiator is put and irradiated with a light outside said cell thereby curing said photosetting polymer precursor selectively at a region free from said transparent pixels and enrich the resulting cured resin at said region.

8 Claims, 3 Drawing Sheets

LIQUID CRYSTAL DISPLAY APPARATUS

This application is a continuation of application Ser. No. 08/630,197 filed of Apr. 10, 1996, now abandoned, which is a continuation of application Ser. No. 08/253,930 filed on Jun. 3, 1994, now abandoned.

BACKGROUND OF THE INVENTION

1. Field of the Invention

The present invention relates to a liquid crystal display apparatus. More particularly, the invention relates to a liquid crystal display apparatus which has a shielding layer provided at least on the periphery of each of transparent pixel electrodes and regions free from the shielding layer in a cell are partitioned with a photosetting polymers.

2. Description of the Related Art

Many display methods have been so far proposed for and used in a liquid crystal display apparatus. For example, a twisted nematic (TN) display method and supertwisted nematic (STN) type display method which both use a nematic liquid crystal have been practically used in a display apparatus employing the electro-optical effect of a liquid crystal. Furthermore, display methods using a ferroelectric liquid crystal have been also proposed.

There is also proposed a display method which employs a dynamic scattering (DS) effect or a phase change (PC) effect of a liquid crystal without using a polarizing plate.

Still furthermore, a polymer dispersion method is also proposed which can electrically control either a transparent state or white suspended state of a liquid crystal without requiring orientation treatment. Fundamentally, this method produces a transparent state of the liquid crystal by allowing a diffraction rate of the liquid crystal to normal light to agree with the diffraction rate of a support medium (polymer) when an orientation in the liquid crystal becomes uniform upon application of voltage. The method also involves displaying the opaque state by using scattered light resulting from a disorder in the orientation of liquid crystal molecules upon application of no voltage.

The International Publication Number WO85/04262 discloses a polymer dispersion method that comprises complicated steps of mixing a liquid crystal and a photosetting or thermosetting resin and curing the resin to form liquid crystal droplets in the resin. Furthermore Japanese Published Unexamined Patent Application No. HEI 3-72317 discloses a method for controlling the diameter of liquid crystal droplets though the diameter cannot be precisely controlled.

Japanese Published Unexamined Patent Application No. HEI No. 2-153318 discloses a polymer dispersion method which uses a photomask to restrict a display area of a display apparatus. In this method, the shape of each of liquid crystal droplets is not controlled with the photomask. Instead a polymer dispersion method comprises applying an electric field for a liquid crystal polymer precursor dispersion to separate a transparent portion and the remaining portion and curing the remaining portion. In this manner, various dispersion methods have been proposed.

In a method for selectively applying light to a mixed system of the above described liquid crystal-polymer precursor, a disclination or a disorder in orientation of the liquid crystal is liable to be generated at a boundary between a pixel portion and a display portion (which contains a large ratio of liquid crystal). Such method has a drawback in that the display portion cannot maintain a uniform size and a high contrast. When light is applied to non-display portion with the photomask, a polymer wall either invade or do not invade the pixel on the order of several mm depending on the accuracy of the photomask and the accuracy in the positioning. Thus, a problem has arisen such as non-uniformity in the size of the display portion.

In particular, for ferroelectric liquid crystal apparatus, Japanese Published Unexamined Patent Application No. SHO 59-201021 discloses a method which involves preparing by photolithography a polymer wall on a substrate which is subjected to an orientation treatment to prepare a cell followed by injecting a liquid crystal material therein. However, the preparation of polymer wall requires a long process including resist coating, patterning, and etching. Furthermore, the method has a drawback of requiring a long time for disposing the liquid crystal.

Furthermore, TN liquid crystals and ferroelectric liquid crystals which require an interface regulating force exhibit a non-uniformity in orientation to some degree at a boundary between a polymer region and a liquid crystal region. Thus, problems arise such as a reduction in response speed and deterioration in contrast. Since a photomask conforms to the configuration of pixels in the process of photolithography, problems arise such as non-uniformity in the area of the open portion of pixels due to effects such as an accuracy of the photomask and accuracy in positioning of the photomask.

SUMMARY OF THE INVENTION

Therefore, the present invention provides a liquid crystal display apparatus comprising:
- a pair of transparent substrates which consists of a driving side substrate and an opposite side substrate;
- transparent pixels formed in matrix on said driving side substrate;
- a first orientation film formed on said pixel;
- a transparent electrode formed on said opposite side substrate;
- a shielding layer provided at least on the periphery of each of said transparent pixels and at either between said driving side substrate and said transparent pixels or between said transparent pixels and said first orientation film;
- said pair of transparent substrates being located opposite to each other to form a cell in which a mixture comprising a liquid crystal, a photosetting polymer precursor and its polymerization initiator is put and irradiated with a light outside said cell thereby curing said photosetting polymer precursor selectively at a region free from said transparent pixels and enrich the resulting cured resin at said region.

Further, the present invention provides a liquid crystal display apparatus comprising:
- a pair of transparent substrates, transparent electrodes formed on each of said substrates so as to form pixels at the crossing parts of said electrodes on orientation film formed on said transparent electrodes;
- a shielding layer provided at least on the periphery of each of said transparent pixels and at either between said driving side substrate and said transparent pixels or between said transparent pixels and said orientation film;
- said pair of transparent substrates being located opposite to each other to form a cell in which a mixture comprising a liquid crystal, a photosetting polymer precursor and its polymerization initiator is put and irradiated with a light outside said cell thereby curing said photosetting polymer precursor selectively at a region free from said transparent pixels and enrich the resulting cured resin at said region.

BRIEF DESCRIPTION OF THE DRAWINGS

The present invention will be detailed in conjunction with the accompanying drawings, but the present invention is not limited thereto.

FIG. 2b is a mask used in the photopolymerization of FIG. 2a.

DESCRIPTION OF THE PREFERRED EMBODIMENTS

Figure 1:
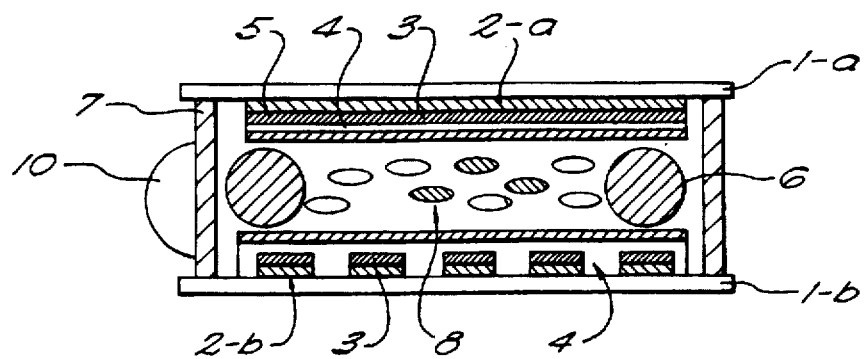
FIG. 1 is a schematic sectional view showing a liquid crystal display apparatus of the present invention.

A liquid crystal display apparatus of the present invention includes a pair of transparent substrates normally made of glass. On one of the pair of transparent substrates, a plurality of a linear pattern of a transparent conductive thin film are made of $InO_3$, $SnO_2$, ITO (Indium Tin Oxide) or the like to constitute scanning electrodes. Transparent electrodes are formed on each of the substrates to form pixels at the crossing parts of said electrodes on an orientation film formed on said transparent electrodes.

On the other transparent substrate a transparent conductive thin film such as an $InO_3$, an $SnO_2$ or an ITO thin film is formed to provide an opposite electrode.

Alternatively, any one of a pair of transparent substrates provides a plurality of linear pattern of a transparent conductive thin film (as mentioned above), so as to make pixels at the crossing parts with the linear pattern of transparent conductive thin film formed on the remaining substrate.

On the electrode an insulating film is arbitrarily formed. As this insulating film, an inorganic film such as an $SiO_2$, $SiN_x$ or $Al_2O_3$ film or an organic film such as a polyimide film, a photoresist resin film-or a liquid polymer film can be used. The inorganic thin film as the insulating film may be formed with such method as the vapor deposition method, sputtering method, CVD method or solution coating method. When the insulating film is provided in the form of the organic thin film, a solution of an organic substance or a precursor solution thereof is coated on the electrode with the spinner coating method, the dip coating method, screen printing method or roll coating method followed by being cured under predetermined curing conditions (heating, light application or the like). The organic insulating film may be formed with the vapor deposition method, sputtering method, CVD method or LB (Langmuir-Blodgett) method.

On the electrode or an insulating film arbitrarily formed, an orientation film is formed. As the orientation film, a conventional inorganic or organic film may be used depending on cases. Examples of the organic orientation films include a layer formed by rubbing a film comprising nylon, polyvinyl alcohol, polyimide or the like. Examples of inorganic orientation films include a film formed by the tilt vapor deposition of $SiO_2$ and $SiN_x$. A film formed by vapor deposition of $SiO_2$ and $SiN_x$ following by the rubbing treatment can also be used as such inorganic orientation film.

In particular, for forming a ferroelectric liquid crystal display apparatus of the present invention, the orientation film is subjected to rubbing treatment after the film is formed. The formation of the orientation film may use the parallel rubbing method (which involves subjecting both of the pair of substrates to rubbing treatment followed by laminating the substrate so that the rubbing direction is the same) and the anti-parallel method (which involves subjecting both of the pair of substrates to rubbing treatment so that the rubbing direction is opposite to each other).

Thus, a driving side substrate on which the pixel is formed and an opposite electrode side substrate are manufactured so that the driving side substrate and the opposite electrode side substrate are opposed to each other, followed by disposing a liquid crystal by injecting, e.g., with the vacuum injection method a mixture of a photosetting polymer precursor, a polymerization initiator and a liquid crystal between the two substrates.

The photosetting polymer precursor used in the present invention such as a monomer and an oligomer may form a polymer wall for ultimately surrounding liquid crystal droplets. The photosetting polymer precursors are monomers such as acrylic (or methacrylic) acid and its esters, e.g. isobutylacrylate, stearyl acrylate, laurylacrylate, isoamylacrylate, n-butylmethacrylate, n-laurylmethacrylate, tridecylmethacrylate, 2-ethylhexylacrylate, n-stearylmethacrylate, cyclohexylmethacrylate, benzylmethacrylate, 2-phenoxyethylmethacrylate, isobornylacrylate, and isobornylmethacrylate. Examples of materials which further enhance the physical strength of the polymer include multifunctional monomers having two or more functions such as bisphenol A dimethacrylate, bisphenol A diacrylate, 1,4-butandiolmethacrylate, 1,6-hexanediolmethacrylate, trimethylol-propanetrimethacrylate, trimethylol-propanetriacrylate, and tetramethyl olmethane tetraacrylate. Preferably, these monomers include halogenated or more specifically chlorinated or fluorinated derivatives such as 2,2,3,4,4,4-hexafluorobutylmethacrylate, 2,2, 3,4,4,4-hexachlorobuthyl-methacrylate, 2,2,3,3-tetrafluoropropyl-methacrylate, 2,2,3,3-teterafluoropropylacrylate, parfluorooctylethylmethacrylate, parchlorooctylethylmethacrylate, parchlorooctylethylacrylate and parfluorooctylethylacrylate.

These monomers may be used singly or in mixture of two or more kinds. In addition, a chlorinated or fluorinated polymer or oligomer may be mixed when needed in actual usage.

As the polymerization initiator (or catalyst), Irugacure 184, 651, 907 (manufactured by Chiba-Geigi), and Darocure 1173, 1116, 2959 (manufactured by Merck) can be used.

The liquid crystal is an organic mixture that can assume liquid crystal state at normal temperature. Examples of the liquid crystals include either nematic liquid crystals and cholesteric liquid crystals or smectic liquid crystals, ferroelectric liquid crystals, and discotic liquid crystals. Liquid crystals of different kinds may be mixed. In particular, the nematic liquid crystal, or the nematic liquid crystal added with the cholesteric liquid crystal or the ferroelectric liquid crystal is preferable in properties. More preferably, liquid crystal which are excellent in resistance against chemical reaction are used because the processing of liquid crystal display includes photopolymerization. Specifically, liquid crystals having a functional group such as fluorine are preferable. Examples of the liquid crytals include ZLI-4801-000, ZLI-4801-001, ZLI-4792 (manufactured by Merck)

A method for polymerization involves applying parallel light approximately vertically relative to the substrates from the outside of the driving side substrate, the light having a selective wavelength that allows photopolymerization of the mixture.

A method for applying light involves linearly applying a beam of laser light. Another method for applying light involves exposing a large area at one time with a photomask. Light source used has a wavelength in the region of visible light and ultraviolet rays. Specifically, the light source includes a quicksilver light, a sodium lamp and a metal hallide lamp.

The degree of separation of the polymer from the mixture varies with conditions such as the mix ratio of the above liquid crystal and the photosetting polymer precursor, light application conditions, the ratio between the light shielding portion and the other portion, the intensity of UV light, the concentration of added polymerization initiator, and temperatures at the time of reaction. When the phase separation of liquid crystal and polymer is promoted by curing the polymer precursor with light application at the mix ratio of 8 (resin) to 2 (liquid crystal) very slowly for 3 to 30 minutes to promote the phase separation of the two, the liquid crystal which conventionally exhibited only disorderly orientation exhibited an orientation conforming to the orientation treatment of the substrate. This is probably because 1) some degree of orientation could be secured when the mixture was injected owing to a. large ratio of liquid crystal content (70% or more, or preferably 75 to 90%), 2) polymerization was slowly promoted locally in a system where a relatively large amount of the liquid crystal is present so that the monomer (polymer precursor) around the reaction region could be sufficiently collected in the reaction region by the effect of the concentration diffusion, and 3) the separability of liquid crystal and polymer has been drawn out with the result that the concentration of the liquid crystal has become very high at a portion which is not subjected to photopolymerization.

When the liquid crystal and the photosetting polymer are phase-separated under the above conditions, a high performance equivalent to the conventional liquid crystal display apparatus can be obtained with the mixture of the liquid crystal and polymer by allowing each pixel to be occupied with the liquid crystal component and allowing the remaining non-display portion to be concentrated with the polymer component. Thus, the various method used in the conventional liquid crystal apparatus can be also used in the display apparatus using the mixture without modifying them.

In accordance with the display apparatus of the invention, a shielding layer is provided either between the transparent substrate and the pixel or between the pixel and the orientation layer in the surrounding area of the pixel.

Figure 4:
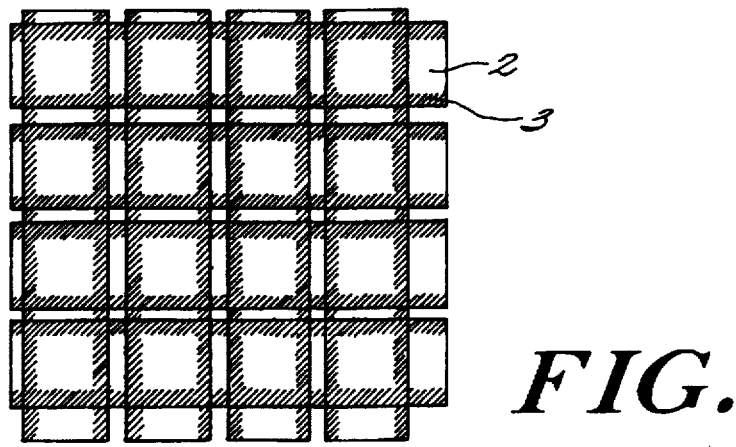
FIG. 4 is a view showing a general configuration of a shielding layer of the present invention.

When the shielding layer is provided between the transparent substrate and the pixel, the shielding layer is formed on the transparent substrate in a predetermined configuration to a predetermined thickness and width with a normal method such as the sputtering method and the etching method. The shielding layer is at least provided so as to correspond to the periphery of the pixel. The mask pattern having a configuration, a thickness and a width equivalent to the shielding layer may be of any kind and is not particularly limited to any specific type as long as the shielding layer shields the periphery of the pixel. However, for example, a type shown in FIGS. 4 and 5 is preferably used. On this shielding layer 3, a pixel and an orientation film are provided in accordance with the above method.

When the shielding layer is provided between the pixel and the orientation film, the shielding layer is provided after the transparent electrode and the pixel, or the transparent electrode, the pixel and the insulating layer are formed. The manufacturing method and the mask pattern in this case is similar to the counterparts described above. The light shielding layer is provided to correspond to the periphery of the pixel thus formed. In addition, the orientation film may be formed on the shielding layer with the above method.

The material of the shielding layer includes metal foils such as Mo, Al, Cr, Ta, Ni and Nb or organic colored materials. Out of them Mo is preferable. This shielding layer is preferably provided with a width of about 10 to 25 mm in a portion where no pixel is formed around the pixel arranged in matrix with a space of, for example, 160 mm. The thickness of the shielding layer made of metal foil is preferably about 50 to 500 nm whereas the thickness of the shielding layer made of an organic colored material is preferably about 2 mm. The organic colored material requires to be thicker because of insufficient light shielding effect. Besides, the thickness of the shielding layer should be less than half of the counterpart of the liquid crystal phase of the liquid crystal panel so that polymer monomers do not inhibit the diffusion and the movement to the light application portion at the time of photopolymerization.

Furthermore, polarizing plates each having a polarizing axis which runs at right angle to each other are arranged on and beneath this cell in such a manner that one of the polarizing axis approximately corresponds to one of the optical axes of the liquid crystal cell thereby providing a liquid crystal display apparatus.

EXAMPLE

FIG. 1 shows a view showing a structure of the liquid crystal apparatus. On a print glass substrate 1 (manufactured by Japan Plate Glass Co., Ltd. and having a thickness of 1.1 mm) was formed in a stripe configuration (an electrode width: 105 mm, a space between electrodes: 15 mm and a number of electrodes: 1000×1000), an ITO electrode 2 (made of a mixture of indium oxide and tin oxide and having a thickness of 2000 Å followed by forming thereon a metal-made shielding layer 3 with the sputtering method to a thickness of 3500 Å, which was then molded into an object pattern with the photoetching method. Then, an SiO film 4 was formed thereon as an insulating film to a thickness of 1000 Å. Then polyimide (SE-150: manufactured by Nissan Chemical Co, Ltd.) to be used as an orientation film paint 5 was coated with the spin on coating method. After the thermosetting process, the substrate thus coated with a polyimide was subjected to rubbing treatment with nylon cloth in one direction. The two substrates that were subjected to the above treatment were assembled to each other so that the electrodes ran at right angles to each other while the rubbing direction ran parallel to each other, the periphery of the two substrates were laminated with each other with epoxy resin 7 with a 2 mm-thick spacer 6 (real ball manufactured by Shokubai Kasei Co., Ltd) sandwiched therebetween followed by injecting with the vacuum injection method a mixture of the liquid crystal 8 and polymer precursor 9 under heating, and sealing the injection port with the resin 10 after the injection of the mixture thereby constituting a cell.

Figure 2A:
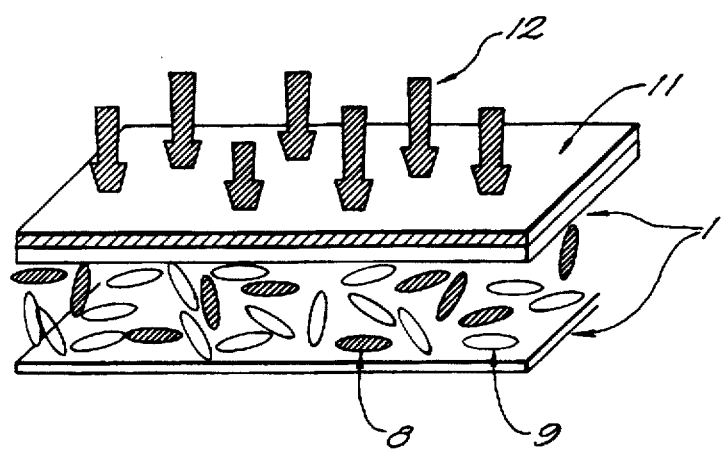
FIG. 2a is a schematic perspective view for illustrating a photopolymerization of the present invention.
Figure 2B:
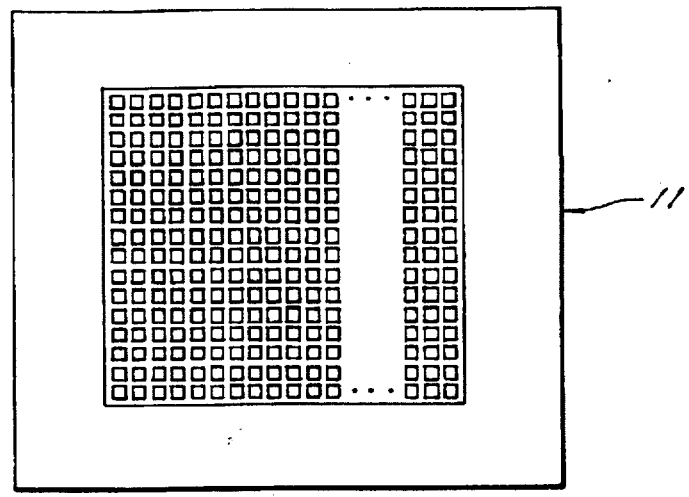
Figure 3:
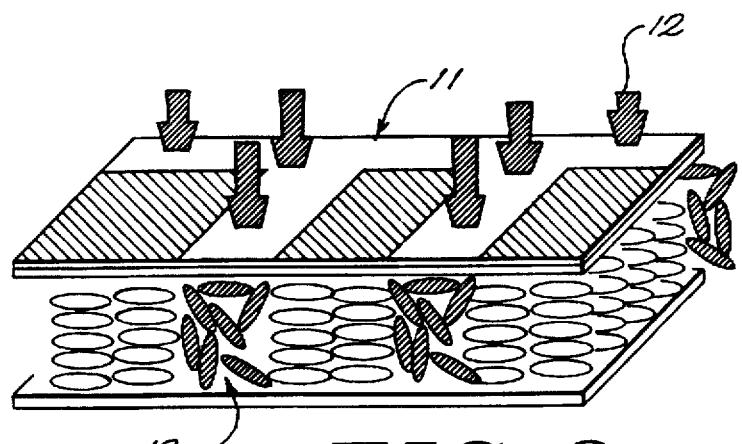
FIG. 3 is a schematic perspective view for illustrating the photopolymerization of the present invention.

The liquid crystal used here was a ferroelectric liquid crystal ZL1-4237$_{000}$ manufactured by Merck which had a the chiral smectic C phase. To the ferroelectric liquid crystal was mixed laurylacrylate (LA) and cyclohexymethacrylate (CHMA). The mix ratio of LC:LA:CHMA was 80:19:1. In addition, the above liquid crystal mixture added with 0.4% of Irugacure 651 (manufactured by Merck) as the polymerization initiator was exposed with a ultraviolet parallel ray through a photomask as shown in FIGS. 2a and 2b and in FIG. 3. The temperature of the liquid crystal mixture at the time of exposure was 100° C. The liquid crystal mixture was exposed when the liquid crystal and the polymer precursor were uniformly mixed without being phase-separated from each other. The exposure time was 20 minutes. After exposure with a mask, the cell was cooled to room temperature. In order to further remove the presence of non-reactants within the cell, the entire surface of the cell was further exposed for ten minutes to provide a liquid crystal display apparatus. After the exposure a light crystal display apparatus was obtained in which a liquid crystal portion and a polymer portion 13 were clearly phase-separated as shown in FIG. 3.

Figure 5A:
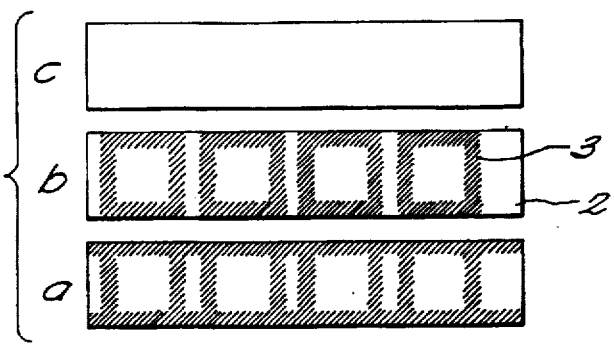
FIG. 5a is a view showing the general configuration of the shielding layer of the present invention.
Figure 5B:
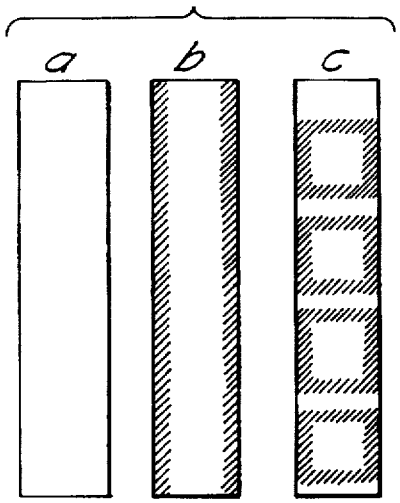
FIG. 5b is a view showing the general configuration of a shielding layer of the present invention.
Figure 6:
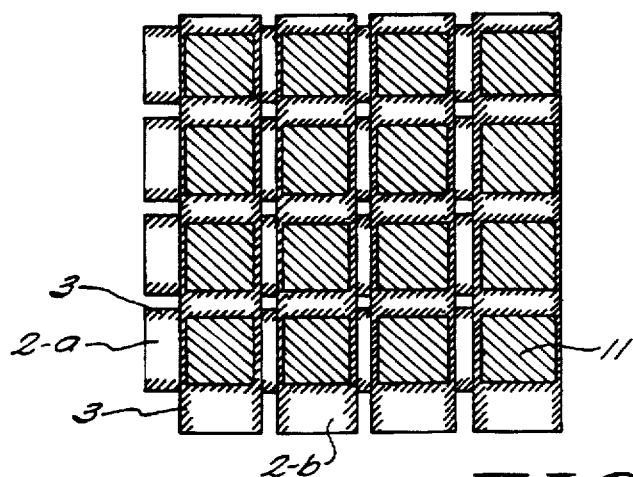
FIG. 6 is a view showing the general configuration of a shielding layer of the present invention.

A mask pattern used here was designed to shield the periphery of the intersection portion (pixel portion) of ITO electrodes 2 on and beneath the liquid crystal cell as shown in FIG. 4. At this time, the pattern configuration of the metal electrode (Mo metal foil which had a thickness of about 15 mm in this Example) for shielding the intersection portion could be available in several kinds of combinations as shown in FIGS. 5a and 5b. When a portion between the polymer portion formed by light application and the pixel portion could be shielded, the configuration was not particularly limited to any specific type. In addition, the light shielding mask was designed having an overlap with a metal electrode formed so as to surround the light shielding pattern and pixel as shown in FIG. 6 thereby enabling the absorption of the shift generated at the time of the position adjustment of the mask and the panel.

The ferroelectric liquid crystal panel thus formed had a structure surrounded by polymer wall for each pixel was a display. The structure also had a very strong shock resistance such that even a pressure of 5 kg/cm$^2$ did not cause a disorder in the orientation. Furthermore, the orientation of the liquid crystal cell in the pixel was arranged in the rubbing direction thereby providing an orientation that allowed display of images. Still furthermore, in a portion light shielded with the metal electrode and non-pixel portion except for a portion light shielded with the photomask (light application portion) a polymer was formed. Still furthermore, when the optical axis of the liquid crystal molecule was arranged in one direction by applying either of the positive or negative switching voltage to this element followed by sandwiching the liquid crystal between polarizing plates in which polarizing axes ran at a right angle to each other, almost no light leaked at a portion where polymer was formed even when the panel position was changed. Still furthermore, the display apparatus was set at a position where light leakage was small which constituted a display apparatus. When the contrast ratio between the ON and OFF states was measured by applying to this display device a pulse for shifting the optical axis, a disorder in the orientation at the periphery of the electrode was covered by the metal portion. Thus, the contrast ratio increased to about 50 as compared with a value 10 when no shielding layer was provided.

In addition, in this particular embodiment, the display method was limited to a ferroelectric liquid crystal display. The method could be applied to a TN, STN, GH and scattered methods using a nematic liquid crystal.

Conditions were not necessarily limited to the light illumination, temperature, the blend ratio between polymer and liquid crystal described in this Example. Curing conditions were required to be appropriately set depending on the kind of material. The methacrylic material compared with the acrylic material generally showed a tendency of slower curing speed. Thus the light application duration was required to be prolonged. Furthermore, the temperature at the time of light application was preferably set at a level where the mixture of liquid crystal and polymer monomer exhibited an isotropic phase in which liquid crystal and polymer monomer were hard to phase-separate from each other. Otherwise, the temperature was set for light illumination to a level where the ferroelectric liquid crystal used in the Example exhibited a isotropic phase.

Besides, metals used for light shielding may be of any type such as tantalum, chromium, molybdenum, aluminum or the like as long as the light shielding function was at least provided. The configuration may be of any type as long as it almost completely surrounds the pixel. On the opposite substrate no metal electrode may not be provided. In addition, the display may be configured in such a manner that the light shielding function and a reduction in the resistance of electrode are doubled out of the necessity of the enlargement of the liquid crystal panel. The order of the formation of metal is not defined, and the metal may be formed before the formation of the transparent electrode.

In accordance with the present invention, the liquid crystal and photosetting or thermosetting polymer precursor complex system is not formed into a distribution system by light and heat from the outside of the display panel as used in the polymer dispersion method. The place of the photopolymerization is controlled with the photomask, followed by causing a slow polymerization reaction so that the liquid crystal phase and the polymer phase are almost completely separated over a wide range (a size on the order of the pixel). For this purpose, the liquid crystal phase and the polymer phase are formed so that the polymer phase is distributed in the neighborhood of the pixels whereas the liquid crystal phase is distributed in the pixel portion. Along with the advancement in the separation of the polymer liquid crystal the orientation treatment effect provided with the substrate appears and the properties of conventional TN and ferroelectric liquid crystal display apparatus can be applied without causing almost any damage. With the adoption of this method, pixels are surrounded by polymers, the movement of the liquid crystal can be inhibited and polymer wall is bonded between the upper and lower substrate with the result that a strong liquid crystal panel can be formed. In addition, the liquid crystal in the panel does not leak out because of the photosetting resin so that such liquid crystal panel does not require a process of the vacuum injection of the liquid crystal. As a consequence, the liquid crystal can be surrounded with light illumination after a mixture liquid of the liquid crystal and polymer precursor which is subjected to cell removal treatment followed by controlling the thickness of the liquid crystal portion by pressing it.

In addition, when the manufacturing method is applied to a ferroelectric liquid crystal, polymer walls connected to the upper and lower substrates can be regularly prepared, and the liquid crystal component can be concentrated on pixels and the conventional properties can be maintained almost completely. Then, the inside of the cell is partitioned with polymer walls so that the cell thickness can be maintained with a large screen, the movement of the liquid crystal can be inhibited and a weak resistance against collision which has been a fatal defect of the ferroelectric liquid crystal can be solved. Furthermore, in the nematic liquid crystal display, the scattering that occurs in the interface between polymer liquid crystal extremely lowers, and the liquid crystal droplet occupies pixel, which enables a high contrast ratio and a low voltage drive.

In addition, in a system which requires an interface regulating force as in TN liquid crystal display apparatus and ferroelectric liquid crystal display apparatus, some degree of disorder in orientation is produced in polymer region and liquid crystal region. The present invention solves this problem by forming inside the panel means for shielding light at a portion where this disorder is generated.

What is claimed is:

1. A liquid crystal display apparatus comprising, a pair of transparent substrates which consists of a driving side substrate and an opposite side substrate;

transparent pixels formed in a matrix on said driving side substrate;

a transparent counter electrode formed on said opposite side substrate;

orientation films provided on each of said substrates;

a shielding layer provided at least on the boundary line of each of said transparent pixels and formed on the outside and/or inside of each said transparent pixels either between said driving side substrate and said transparent pixels or between said transparent pixels and said orientation film;

said pair of transparent substrates being located opposite to each other to form a cell in which a liquid crystal layer includes polymer portions at non-pixel regions and liquid crystal portions at pixel portions said liquid crystal layer being formed by selectively irradiating with a light a mixture comprising a liquid crystal, photosetting polymer precursor and its polymerization initiator, said liquid crystal portions being substantially free of polymer.

2. A liquid crystal display apparatus as claimed in claim 1, wherein said shielding layer is formed at least on the periphery of the electrode and between the electrode and the polymer portions.

3. A liquid crystal display apparatus comprising;

a pair of transparent substrates, transparent electrodes formed in a stripe configuration on each of said substrates;

an orientation film formed on said transparent electrodes;

said pair of transparent substrates are placed so that said transparent electrodes intersect each other to form pixels at the crossing parts of said transparent electrodes;

a shielding layer provided at least on the boundary line of each of said transparent electrodes and formed on the outside and/or inside of each of said transparent pixels either between said transparent substrate and said transparent electrodes or between said transparent electrodes and said orientation film;

said pair of transparent substrates being located opposite to each other to form a cell in which a liquid crystal layer including polymer portions at the non-pixel regions and liquid crystal portions at pixel portions is formed by selectively irradiating with a light a mixture comprising a liquid crystal, photosetting polymer precursor and its polymerization initiator, said liquid crystal portions being substantially free of polymer.

4. An apparatus according to claim 1 or 3 wherein said shielding layer has a width of 10 to 25 nm.

5. An apparatus according to claim 1 or 3 wherein said liquid crystal is selected from a nematic liquid crystal, a nematic liquid crystal added with a cholesteric liquid crystal or a ferroelectric liquid crystal.

6. An apparatus according to claim 1 or 3 wherein said liquid crystal occupies 90 to 75% of the mixture.

7. An apparatus according to claim 1 or 3 wherein said shielding layer has a thickness of 50 to 500 nm.

8. A liquid crystal display apparatus as claimed in claim 3, wherein said shielding layer is formed at least on the periphery of the electrode and between the electrode and the polymer portions.

* * * * *